(12) United States Patent
Ielkin et al.

(10) Patent No.: US 12,093,249 B2
(45) Date of Patent: Sep. 17, 2024

(54) DYNAMIC INCLUSION OF METADATA CONFIGURATIONS INTO A LOGICAL MODEL

(71) Applicant: Oracle International Corporation, Redwood Shores, CA (US)

(72) Inventors: Dmytro Ielkin, Odesa (UA); Jessica Lin, Virginia Beach, VA (US); Andrii Zagoruiko, Vršovice (CZ); Serhii Derevianko, Odesa (UA); Oleksandr Bielov, Odesa (UA); Anastasiia Pirus, Kharkov (UA); Oleksandr Annenkov, Zaporizhzhya (UA); Serhii Kravchenko, Velikyi Dalnik (UA); Saak Akopov, Kyiv (UA)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 17/896,613

(22) Filed: Aug. 26, 2022

(65) Prior Publication Data
US 2024/0070147 A1    Feb. 29, 2024

(51) Int. Cl.
G06F 16/23    (2019.01)

(52) U.S. Cl.
CPC ................ G06F 16/2393 (2019.01)

(58) Field of Classification Search
CPC ... G06F 16/211; G06F 16/213; G06F 16/2393
See application file for complete search history.

(56) References Cited

U.S. PATENT DOCUMENTS

| 8,311,975 | B1* | 11/2012 | Gonsalves | G06F 16/283 |
| | | | | 707/606 |
| 10,169,378 | B2 | 1/2019 | Sassin | |
| 11,263,192 | B2* | 3/2022 | Chang | G06F 16/288 |
| 11,403,338 | B2* | 8/2022 | Khanafer | G06F 16/5854 |
| 11,556,523 | B2* | 1/2023 | Kruempelmann | G06F 16/2379 |
| 2007/0136323 | A1* | 6/2007 | Zurek | G06F 16/283 |

(Continued)

FOREIGN PATENT DOCUMENTS

CA    3115220 A1    7/2023

OTHER PUBLICATIONS

International Search Report and Written Opinion for International Application No. PCT/US2023/030657 dated Dec. 14, 2023.

(Continued)

*Primary Examiner* — William Spieler
(74) *Attorney, Agent, or Firm* — Potomac Law Group, PLLC

(57) ABSTRACT

Embodiments generate changes to a logical model. Embodiments receive the changes in a configuration file, the changes comprising a declarative configuration, extract the changes and load the changes into a database and update a corresponding database model. Embodiments generate a first logical model that represents the database model and generate a second logical model that includes the changes. Embodiments generate automatically in a container using the declarative configuration a compiled visualization image from the second logical model, wherein the visualization image is adapted to be used by a business intelligence system to provide a visualization of data that incorporates the changes.

20 Claims, 9 Drawing Sheets

(56) References Cited

U.S. PATENT DOCUMENTS

| | | | |
|---|---|---|---|
| 2009/0055439 A1* | 2/2009 | Pai | G06F 16/24573 |
| 2009/0063437 A1* | 3/2009 | Hendrey | H04L 67/02 |
| 2010/0287185 A1* | 11/2010 | Cras | G06F 16/24528 |
| | | | 707/769 |
| 2011/0029579 A1 | 2/2011 | Lions | |
| 2014/0344211 A1 | 11/2014 | Allan et al. | |
| 2016/0034809 A1* | 2/2016 | Trenholm | G06F 18/00 |
| | | | 706/20 |
| 2018/0150499 A1* | 5/2018 | Lee | G06F 11/2038 |
| 2022/0121632 A1 | 4/2022 | Sassin | |

OTHER PUBLICATIONS

Unknown, Altexsoft: "A Complete Guide to Data Visualization in Business Intelligence: Problems, Libraries, and Tools to Integrate, Free Data Visualization Tools", Data Science, pp. 1-18, 2019.

* cited by examiner

Daily Sales Fact Table
- Product ID (FK)
- Store ID (FK)
- Date ID (FK)
- Quantity Sold
- Dollar Sales Amount

Fig. 3

| ID | Product ID | Store ID | Date ID | Quantity Sold | Dollar Sales Amount |
|---|---|---|---|---|---|
| 101 | 1 | 201 | 377 | 44 | 62.20 |
| 102 | 2 | 201 | 377 | 55 | 78.40 |
| 103 | 3 | 201 | 377 | 100 | 180.00 |
| 104 | 4 | 201 | 377 | 121 | 142.60 |
| 105 | 5 | 201 | 377 | 55 | 80.30 |
| 106 | 6 | 206 | 377 | 12 | 17.20 |
| 107 | 7 | 206 | 377 | 33 | 45.40 |
| 108 | 8 | 206 | 377 | 50 | 63.80 |
| 109 | 9 | 206 | 377 | 125 | 112.70 |

Fig. 4

Product Dimension Table

- Product ID (PK)
- Product Name
- SKU Number (Natural key)
- Brand Description
- Subclass Description
- Class Description
- Department Description
- Company Description
- Package Type
- Package Height
- Package Width
- Package Depth
- Volume
- Volume Unit of Measure
- Weight
- Weight Unit of Measure

Fig. 5

| PROD ID | SKU | Name | Brand | SubClass | Class | Depart | Comp | Volume | Volume UoM |
|---|---|---|---|---|---|---|---|---|---|
| 1 | 112234 | Winter Ale | Sam Adams | Premium | Domestic Beer | Brewed Beverages | Liquor Corp | 12 | oz |
| 2 | 112241 | Oktoberfest | Sam Adams | Premium | Domestic Beer | Brewed Beverages | Liquor Corp | 12 | oz |
| 3 | 112242 | Pale Ale | Sam Adams | Premium | Domestic Beer | Brewed Beverages | Liquor Corp | 12 | oz |
| 4 | 112252 | IPA | Becks | Premium | Foreign Beer | Brewed Beverages | Liquor Corp | 16 | oz |
| 5 | 112300 | Pilsner | Becks | Premium | Foreign Beer | Brewed Beverages | Liquor Corp | 16 | oz |
| 6 | 114422 | Coors | Miller | Domestic | Domestic Beer | Brewed Beverages | Liquor Corp | 12 | oz |
| 7 | 114442 | Coors Light | Miller | Light | Domestic Beer | Brewed Beverages | Liquor Corp | 12 | oz |
| 8 | 115522 | Budweiser | Budweiser | Domestic | Domestic Beer | Brewed Beverages | Liquor Corp | 12 | oz |
| 9 | 115532 | Budweiser Light | Budweiser | Light | Domestic Beer | Brewed Beverages | Liquor Corp | 12 | oz |

Fig. 6

Star Schema

DYNAMIC INCLUSION OF METADATA CONFIGURATIONS INTO A LOGICAL MODEL

One embodiment is directed generally to a computer system, and in particular to facilitating the visualization of underlying data of a computer system using metadata configurations.

BACKGROUND INFORMATION

Data warehousing tools or business intelligence platforms, such as Oracle Business Intelligence Enterprise Edition ("OBIEE"), Oracle Analytics Cloud ("OAC") or Oracle Analytics Server ("OAS"), allow logical database schemas to be defined on top of physical database tables. Logical database schemas include patterns that illustrate relationships between underlying physical database tables. For example, it is possible to define star schemas that illustrate relationships between tables and to join tables that are logically related together.

Knowing relationships between underlying database tables is essential in efficiently retrieving data from a database. For example, in order to form database queries that provide meaningful results, it is necessary to specify in each query the tables to be searched and filter criteria for narrowing results to be presented from the combination of tables. Without knowledge of relationships between tables and the structure of data within tables, queries will produce results that are not meaningful to the end user.

SUMMARY

Embodiments generate changes to a logical model. Embodiments receive the changes in a configuration file, the changes comprising a declarative configuration, extract the changes and load the changes into a database and update a corresponding database model. Embodiments generate a first logical model that represents the database model and generate a second logical model that includes the changes. Embodiments generate automatically in a container using the declarative configuration a compiled visualization image from the second logical model, wherein the visualization image is adapted to be used by a business intelligence system to provide a visualization of data that incorporates the changes.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 3 illustrates fact table for daily sales facts.

FIG. 4 illustrates the fact table of FIG. 3 populated with measurement data.

FIG. 5 illustrates a dimension table concept for the product dimension in the fact table of FIG. 3, and FIG. 6 illustrates the dimension table populated with attributes for the product dimension.

DETAILED DESCRIPTION

One embodiment automatically generates and then includes metadata configurations in the form of catalog files into a logical model, such as the business intelligence repository database files ("RPD files"). The metadata configurations can be used to automatically create visualizations for many underlying different tenant data stores.

Embodiments flexibly include metadata configurations (i.e., a file of configurations) such as catalog files into the RPD of Oracle Analytics Cloud ("OAC"), or any other business intelligence system that implements RPD files. The Oracle BI Repository (RPD file) stores BI Server customer specific BI server configuration metadata. The metadata defines logical schemas, physical schemas, physical-to-logical mappings, aggregate table navigation, and other constructs. RPD files have historically been compressed files which are difficult to update or maintain, particularly for a multi-tenant application. Therefore, embodiments generate and store the RPD separately from the OAC instance (e.g., at 120 of FIG. 1 instead of 125). This improves the ability of the user to upgrade versions of OAC more modularly.

In embodiments, metadata configuration, or configuration metadata, are the rules to modify and tune the repository database to indicate updates such as: new visualizations, new data elements to be rendered, aggregations, etc.

A business intelligence ("BI") platform such as Oracle® Business Intelligence Enterprise Edition ("OBIEE"), Oracle® Analytics Cloud ("OAC") or Oracle® Application Server ("OAS"), generally referred to as "Oracle Analytics" or a "BI system", may be extended to integrate the catalog files (i.e., a file of configurations, or metadata configurations) into one or more BI repository files (RPD file) which represents the logical model that is presented to the customer. The catalog files are used to create custom visualizations from the logical model, which may be presented in OBIEE, OAC and OAS Data Visualization ("DV") graphical user interfaces ("GUI"s).

Embodiments flexibly include catalog files into the RPD of OAS or another BI application that utilizes RPD. RPD is the file in OBIEE, OAC, OAS that stores the metadata and rules for creating and presenting a logical database schema. RPDs have historically been compressed files which are difficult to update or maintain, especially for a multi-tenant application. For example, known processes for updating the catalog file for each of the many tenants in a multi-tenant instance are manual, so the level of effort increases as the number of tenants increases.

Figure 1:
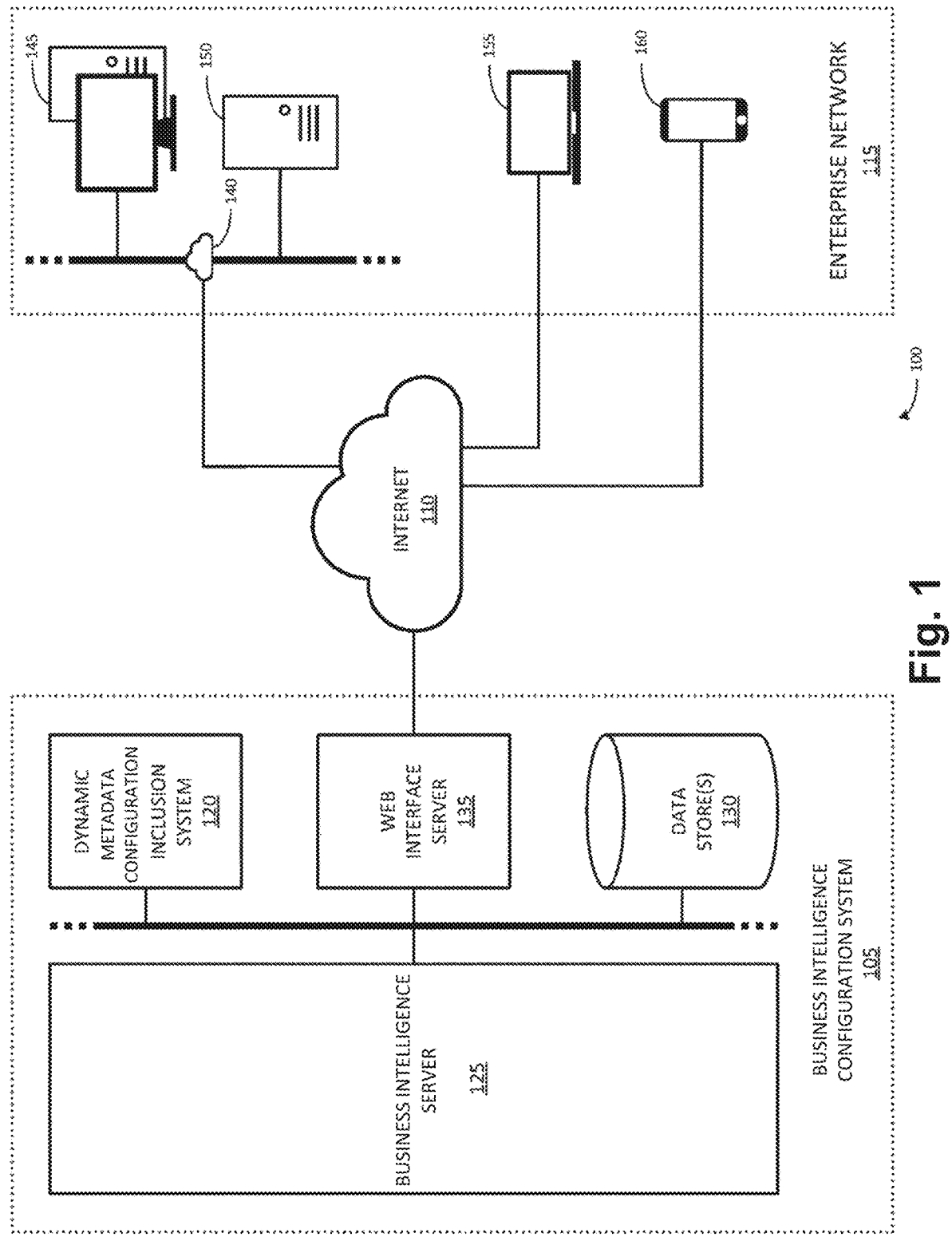
FIG. 1 is a block diagram of a BI system that includes BI functionality for an enterprise network and that includes the dynamic artifact inclusion functionality in accordance with embodiments of the invention.

In response, embodiments generate and store the RPD separately from the analytics instance (i.e., at 120 of FIG. 1 instead of the BI platform/tool/system 125). This improves the ability of the user to upgrade versions of OAS or any other BI application more modularly because RPD is typically tied to an analytics instance for a single owner. In contrast, embodiments use a separate storage mechanism where the RPD is stored to be used for different owners/users. A separate storage makes it possible for an administrator to update the configurations for the users in advance of the users receiving an instance for use. For example, one instance is one connection of a BI system (e.g., server 125 of FIG. 1 below) to one enterprise network (e.g., enterprise network 115 of FIG. 1 below).

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram of a BI system 100 that includes BI functionality for an enterprise network and that includes the dynamic artifact inclusion functionality in accordance with embodiments of the invention. In one embodiment, system 100 includes a business intelligence configuration system 105 connected by the Internet 110 (or another suitable communications network or combination of networks) to an enterprise network 115. In one embodiment, business intelligence configuration system 105 may be an OBIEE, OAC, or OAS service implementation, or any other BI system that implements RPD files. In one embodiment, business intelligence configuration system 105 includes various systems and components such as dynamic metadata configuration inclusion server/module 120, business intelligence server 125, data store(s) 130, and web interface server 135.

In one embodiment, dynamic metadata configuration inclusion server 120 includes one or more components configured for implementing methods, functions, and features described herein associated with dynamic inclusion of metadata configuration into a logical model.

In one embodiment, business intelligence server/system 125 may include business intelligence applications and functions for retrieving, analyzing, mining, visualizing, transforming, reporting, and otherwise making use of data associated with the operation of a business. In one embodiment, business intelligence server 125 may include data gathering components that capture and record the data associated with operation of the business in a data repository such as data store(s) 130. In one embodiment, other business intelligence server 125 may further include user administration modules for governing the access of users to business intelligence configuration system 105.

Each of the components of business intelligence configuration system 105 is configured by logic to execute the functions that the component is described as performing. In one embodiment, the components of business intelligence system may each be implemented as sets of one or more software modules executed by one or more computing devices specially configured for such execution. In one embodiment, the components of business intelligence configuration system 105 are implemented on one or more hardware computing devices. In one embodiment, the components of business intelligence configuration system 105 are each implemented by dedicated computing devices. In one embodiment, the components of business intelligence configuration system 105 are implemented by a common (or shared) computing device, even though represented as discrete units in FIG. 1. In one embodiment, business intelligence configuration system 105 may be hosted by a dedicated third party, for example in an infrastructure-as-a-service ("IAAS"), platform-as-a-service ("PAAS"), or software-as-a-service ("SAAS") architecture. In one embodiment, the components of business intelligence configuration system 105 intercommunicate by electronic messages or signals. These electronic messages or signals may be configured as calls to functions or procedures that access the features or data of the component, such as for example application programming interface ("API") calls. Each component of business intelligence configuration system 105 may parse the content of an electronic message or signal received to identify commands or requests that the component can perform, and in response to identifying the command, the component will automatically perform the command or request.

Enterprise network 115 may be associated with a business. For simplicity and clarity of explanation, enterprise network 115 is represented by an on-site local area network 140 to which one or more personal computers 145, or servers 150 are operably connected, along with one or more remote user computers 155 or mobile devices 160 that are connected to the enterprise network 115 through the Internet 110. Each personal computer 145, remote user computer 155, or mobile device 160 is generally dedicated to a particular end user, such as an employee or contractor associated with the business, although such dedication is not required. The personal computers 145 and remote user computers 155 can be, for example, a desktop computer, laptop computer, tablet computer, or other device having the ability to connect to local area network 140 or Internet 110. Mobile device 160 can be, for example, a smartphone, tablet computer, mobile phone, or other device having the ability to connects to local area network 140 or Internet 110 through wireless networks, such as cellular telephone networks or Wi-Fi. Users of the enterprise network 115 interface with business intelligence configuration system 105 across the Internet 110 (or another suitable communications network or combination of networks).

In one embodiment, remote computing systems (such as those of enterprise network 115) may access information or applications provided by business intelligence configuration system 105 through web interface server 135. In one embodiment, the remote computing system may send requests to and receive responses from web interface server 135. In one example, access to the information or applications may be effected through use of a web browser on a personal computer 145, remote user computers 155 or mobile device 160. For example, these computing devices 145, 155, 160 of the enterprise network 115 may request and receive a web-page-based graphical user interface ("GUI") for dynamically displaying visualization data for use in business intelligence configuration system 105. In one example, web interface server 135 may present HTML code to personal computer 145, server 150, remote user computers 155 or mobile device 160 for these computing devices to render into the GUI for business intelligence configuration system 105. In another example, communications may be exchanged between web interface server 135 and personal computer 145, server 150, remote user computers 155 or mobile device 160, and may take the form of remote representational state transfer ("REST") requests using JavaScript object notation ("JSON") as the data interchange format for example, or simple object access protocol ("SOAP") requests to and from XML servers. For example, computers 145, 150, 155 of the enterprise network 110 may request information included in the custom columns, or may request information derived at least in part from information included in the custom columns (such as analytics results based at least in part on the custom columns).

In one embodiment, data store 130 includes one or more operational databases configured to store and serve a broad range of information relevant to the operation of a business, such as data about enterprise resource planning, customer relationship management (including customer data such as account number, demographic information, $3^{rd}$ party data, etc.), finance and accounting, order processing, time and billing, inventory management and distribution, employee management and payroll, calendaring and collaboration, product information management, demand & material requirements planning, purchasing, sales, sales force automation, marketing, ecommerce, vendor management, supply chain management, product lifecycle management, descriptions of hardware assets and their statuses, production output, shipping and tracking information, and any other information collected by the business. Such operational information may be stored in the operational database in real-time at the time the information is collected. In one embodiment, the data store 130 includes a mirror or copy database for each operational database which may be used for disaster recovery, or secondarily to support read-only operations. In one embodiment, the operational database is an Oracle® database. In some example configurations, data store(s) 130 may be implemented using one or more Oracle® Exadata compute shapes, network-attached storage ("NAS") devices and/or other dedicated server device.

Figure 2:
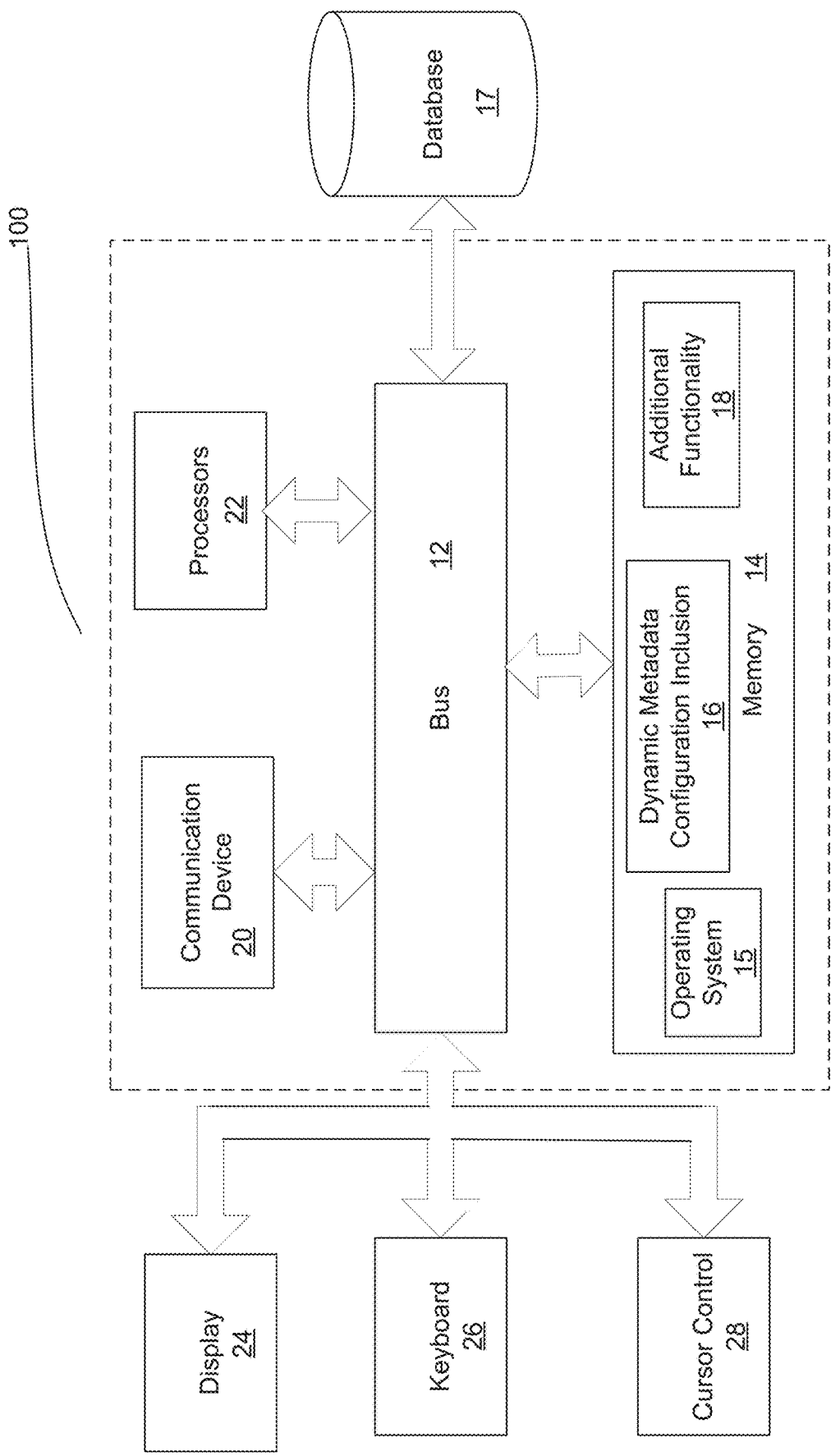
FIG. 2 is a block diagram of one or move components of the BI system of FIG. 1 in the form of a computer server/system in accordance with an embodiment of the present invention.

FIG. 2 is a block diagram of one or move components of BI system 100 of FIG. 1 in the form of a computer server/system 100 in accordance with an embodiment of the present invention. Although shown as a single system, the functionality of system 100 can be implemented as a distributed system. Further, the functionality disclosed herein can be implemented on separate servers or devices that may be coupled together over a network. Further, one or more components of system 100 may not be included. One or more components of FIG. 2 can also be used to implement any of the elements of FIG. 1.

System 100 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 100 further includes a communication device 20, such as a network interface card, to provide access to a network. Therefore, a user may interface with system 100 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a dynamic metadata configuration inclusion module 16 that provides the functionality of the dynamic inclusion of metadata configuration into a logical model, and all other functionality disclosed herein. System 10 can be part of a larger system. Therefore, system 10 can include one or more additional functional modules 18 to include the additional functionality, such as any other BI functionality disclosed above (e.g., OBIEE, OAS, etc.). A file storage device or database 17 is coupled to bus 12 to provide centralized storage for modules 16 and 18, as well as implementing data stores 130 of FIG. 1. In one embodiment, database 17 is a relational database management system ("RDBMS") that can use Structured Query Language ("SQL") to manage the stored data.

In one embodiment, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

As disclosed, many BI analytic tools using RPD, such as OAS, is created as a single tenant application for end-users. In general, the end-user is responsible for their own repository database (RPD). The Oracle BI Repository (RPD file) stores BI server metadata. The metadata defines logical schemas, physical schemas, physical-to-logical mappings, aggregate table navigation, and other constructs. End users are expected to edit their Oracle BI repositories using a BI administration tool.

However, the is a need to enable a multi-tenant application of OAS or other BI system to users/clients/developers who maintain the RPD for the customer/user/client. There is a need for users who maintain the data store for the client (i.e., data store 130 of FIG. 1), in which case it is more efficient for the user/client/developer to also maintain the RPD since they are closer to the data model then the typical client who maintains their own data store.

In a business intelligence system such as system 105 of FIG. 1, a dimensional model describes the structure of the data for the business intelligence system by relating facts to dimensions. The dimensional model is stored as a business intelligence platform repository file (also referred to as an RPD file or BI repository file). The BI repository file defines logical schemas, physical schemas, and physical-to-logical mappings. The BI repository file represents the dimensional model in three layers: physical layer, business model and mapping layer, and presentation layer. The physical layer defines the objects and relationships of the original data source. The business model and mapping layer defines the business or logical model of the data and specifies the mapping between the logical model and the physical schemas. The presentation layer controls the view of the logical model given to the users.

A process of automatic generation of logical database schemas such as RPD includes identifying physical fact tables, dimension tables, and relationships between tables and using metadata associated with the identified tables to merge related tables and generate logical schema that are useful for subsequent data retrieval and database updating.

A fact table in a dimensional database model is a table that stores measurements for events. FIG. 3 illustrates fact table for daily sales facts. In FIG. 3, the fact table includes rows that correspond to data items that would be present for a sale of a product. In the illustrated example, these items include product ID, store ID, date ID, quantity sold, and dollar sales amount. Even for a single store in a single day, there could be hundreds or thousands of entries in such a table.

Some of the rows in the fact table are foreign keys ("FK"s). A foreign key is a link to a dimension table. A dimension table is a table that stores context associated with an event that that is referred to by one or more fact tables. In the daily sales fact table, the product ID, stored ID, and date ID attributes that refer to one or more dimension tables.

As disclosed, a fact table may include measurements from each sales transaction that occurs in a time period. FIG. 4 illustrates the fact table of FIG. 3 populated with measurement data. In the fact table illustrated in FIG. 4, each row corresponds to a single transaction (e.g., a sale), and each column corresponds to a measure, which are also foreign keys. In the real world, a product sales fact table such as that illustrated in FIG. 4 could include billions of rows, each with many different links or keys to dimension tables. Such a fact table may be part of a data warehouse schema that is initially imported into a data warehousing tool, such as OBIEE. In order to properly format structured queries to the database, it is necessary to know the relationships between the tables, which is referred to as the database schema.

In order to make queries and updates to database tables more efficient, a logical layer can be defined on top of physical database tables, and a presentation layer may be defined on top of the logical layer. Defining a logical database schema includes defining logical fact tables from physical fact tables, defining logical dimension tables from physical dimension tables, and linking the logical tables. Examples of how logical fact and dimension tables are defined and linked are disclosed below.

A dimension table is a table to which one or more fact tables point and which stores attributes that describe a dimension. A dimension table contains a single primary key that corresponds to a foreign key in an associated fact table. FIG. 5 illustrates a dimension table concept for the product dimension in the fact table of FIG. 3, and FIG. 6 illustrates the dimension table populated with attributes for the product dimension. For example, as illustrated in FIG. 5, a product dimension table may include a hierarchy of product identification identifiers, such as SKU, name, subclass, class, department, etc. The product ID attribute is a primary key ("PK"). The primary key is a unique key that identifies a dimension table column. In FIG. 5, the primary key product ID identifies the first column in the physical dimension table illustrated in FIG. 6. The primary key product ID is also embedded as the foreign key in the fact table illustrated in FIG. 3. A natural key is a key that is created subject to a business rule outside of the control of the data warehousing system. In the illustrated example, the SKU number is a natural key because it is created by the inventory control system of a retail establishment. It should be noted from the dimension table in FIG. 6 that each product ID 1-9 includes plural attributes.

In order to determine sales for a particular product at a particular store, it would be necessary to specify in the query the fact table illustrated in FIG. 4, the dimension table illustrated in FIG. 6, and a filter on the product ID of interest. However, the query originator may not know the relationship between the tables and thus may not format the query correctly. The problem becomes more difficult as the number of tables and interrelationships increase. In order to avoid this problem, it is necessary to define a dimensional schema that shows the logical relationships between tables.

Figure 7:
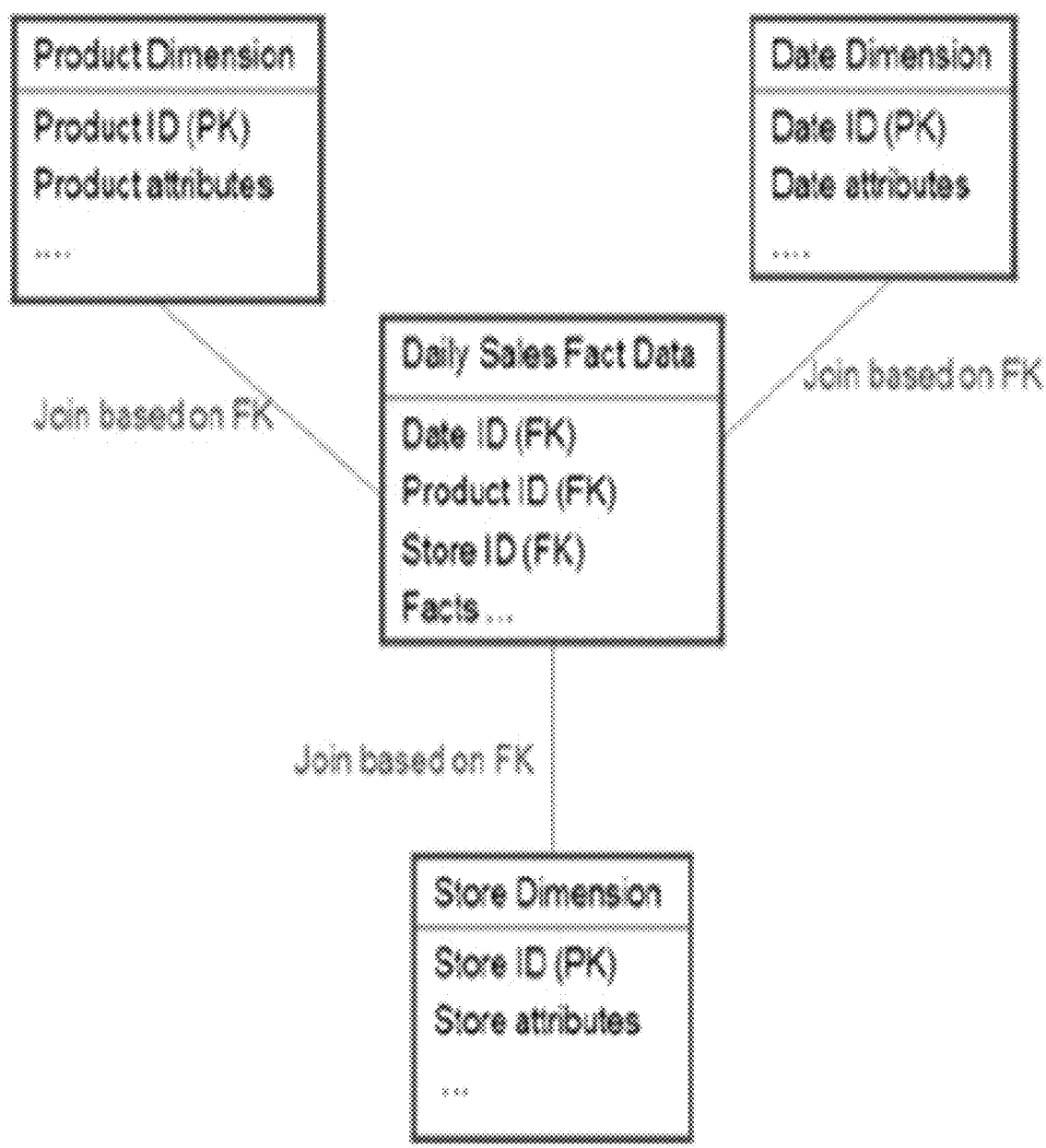
FIG. 7 illustrates an example of a star schema generated from the sales fact table in FIG. 3 and its associated dimension tables.

A dimensional schema is a representation of relationships between logical dimension tables and logical fact tables. Such a dimensional relationship may be generated manually by a database developer based on logical facts and relationships with dimensions. FIG. 7 illustrates an example of a star schema generated from the sales fact table in FIG. 3 and its associated dimension tables. In the illustrated example, a daily sales logical fact table includes the categories for the measures illustrated in FIG. 3. The logical fact table is logically joined dimension tables, a product dimension table, a date dimension table, and a store dimension table, each of which contains attributes for a particular dimension, where the dimensions are product, date, and store.

Creating a complete logical dimensional database schema for an underlying physical database schema includes a logical database schema generator that transforms physical database tables and metadata into business intelligence (BI) tool metadata describing the logical schema structure. The base mechanism for the logical database schema generator may be table, view and column metadata, primary keys (PKs) and FK relationships, database table and column comments, and dimensions objects. The logical database schema generator may also utilize constraints, indexes and other metadata to generate the logical database schemas.

The logical database schema generator may enhance or extend physical schema metadata with metadata derived from base schema using conventions, e.g., naming conventions or default assumptions (measure aggregation rule, target level rule). The logical database schema generator may also use explicit overrides and definitions from external files in case information cannot be derived, e.g., target hierarchy level, derived measure definitions or aggregation rules, when deriving the logical database schema.

Additional details on the automatic generation of logical database schemas from physical database tables and metadata are disclosed in U.S. Pat. No. 10,169,378, the disclosure of which is herein incorporated by reference.

Figure 8:
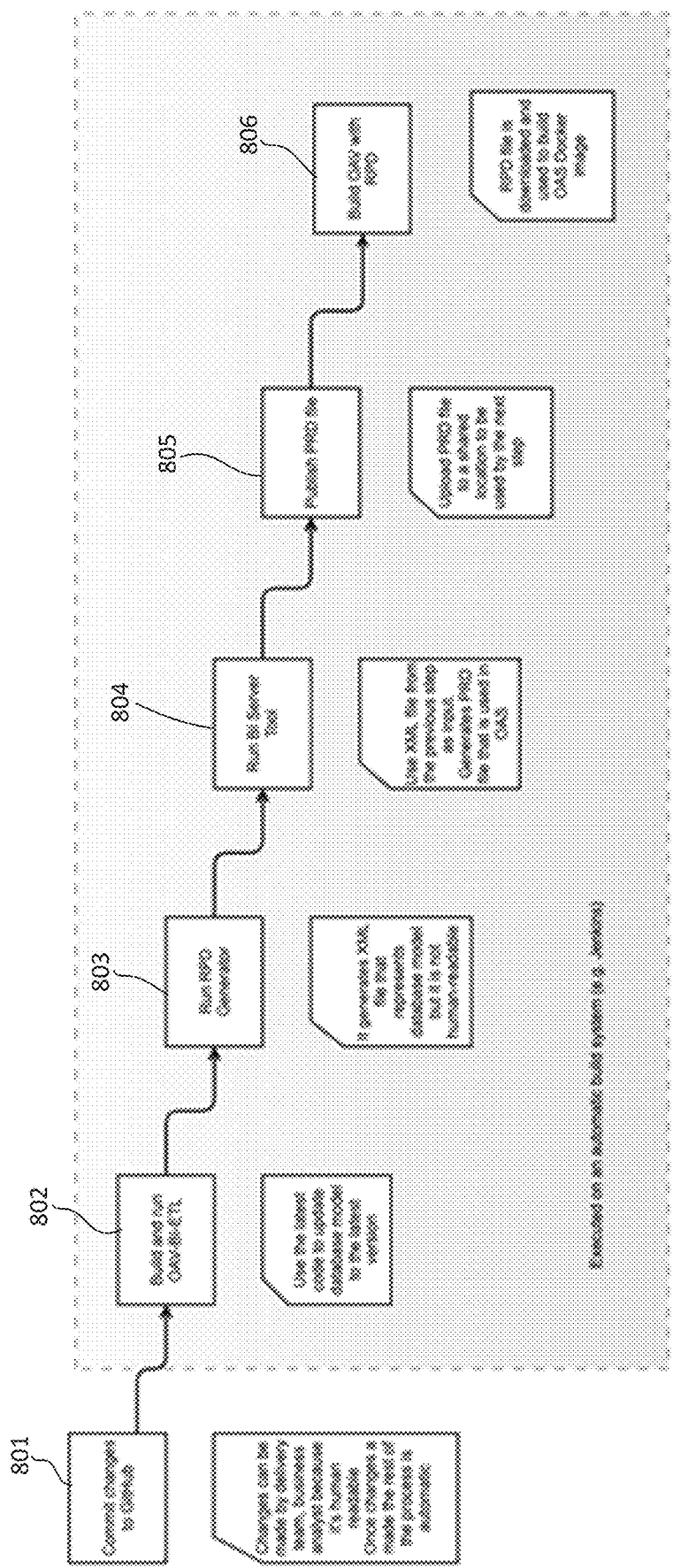
FIG. 8 is a flow diagram of the functionality of the dynamic metadata configuration inclusion module of FIG. 2 when performing the dynamic inclusion of metadata configuration into a logical model functionality in accordance to embodiments.

FIG. 8 is a flow diagram of the functionality of dynamic metadata configuration inclusion module 16 of FIG. 2 when performing the dynamic inclusion of metadata configuration into a logical model functionality in accordance to embodiments. In one embodiment, the functionality of FIG. 8, and FIG. 9 below, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

In general, in conjunction with FIG. 8, the following applies before adding any new data elements to an Oracle Analytics or BI system dataset in embodiments:

All tables must be of either FACT or DIMENSION type;

A DIMENSION table usually has only primary key and attribute fields;

A FACT table has both an attribute column, measure columns and foreign key columns referencing to DIMENSION table primary keys;

Measure column is some numeric value that aggregation functions (COUNT, SUM, AVG, etc.) will be applied to;

Attribute is some discrete text or numeric value such as Name, Location, or Energy Burden bucket. Non-bucketed Energy Burden value is not a good example of an attribute, this numeric value should be a measure;

Example: existence of a DATE column in a table is an indicator that the table is a FACT table and each date column becomes a reference to DATE dimension along with other references to other dimension;

Each FACT table will be presented as Subject Area in OAV. Despite the fact that it is possible to build a Subject Area from multiple FACT tables, it is not supported in RPD Generator. So, there will be exactly one Subject Area for one FACT table;

Each DIMENSION table will be presented as a folder with attributes bound to one or more Subject Areas;

The main condition to attach a attributes from a dimension to a Subject Area is having a foreign key in the FACT table to the DIMENSION table;

In embodiments, after a set of FACT and DIMENSION tables is defined in the source of "big" data, or a data warehouse, such as Hadoop storage, and have data loaded using an Exchange Transfer Load ("ETL") job, or any other way data is loaded, it is time to implement the physical part of it in the ETL job:

Define physical tables for Oracle database;

Define which table will be loaded from the Hadoop Distributed File System to the Oracle database;

Loading tables 1:1 is usually not enough so additional tables and transform scripts are required, define them and create the transforms;

Define the views. A separated schema exists for views, the one with OBIEE suffix. Only this schema is visible by the OAS application. It is a presentation mart for the data, containing "clean" version of the schema, hiding temporary and intermediate tables and columns.

The schema ETF job will be read by RPD generator which will try to figure out the logical data model from it and it is usually enough for draft version of data model to present and further development. Further steps, except schema and changes, are overriding default RPD generator behavior, such as renaming data elements or defining sort columns.

The functionality of FIG. 8 allows many different instances of an OAS (also referred to as "OAV" or Oracle Utilities Opower Analytics Visualization) or any BI system using RPD. Specifically, the functionality of FIG. 8, allows an organization, for its 10-100s of clients, to have its development team update the unique metadata for each client flexibly, rather than having to do so manually for each client.

For example, a data analytic company that works with utilities that receives a large amount of source data, instead of the company's clients, can pre-configure the data that will be visualized by a BI system. In one example, the company receives data from the client daily and the development team of the company is logically mapping this data so for the client who otherwise may not have access because as a program manager the data may only be available through their IT teams or marketing teams of their own organization which may be very siloed. The utility company already gets a daily data feed for other products, such as home energy reports, but the insights are very useful for program manager clients who are usually non-technical. By updating the RPD, the developers of the utility company take the technical challenges of setting up the data out of the hands of the users and are able to set everything up so that it is ready for immediate use upon arrival.

The functionality of FIG. 8, in general, automatically integrates the output of an RPD generator with an OAS or any other Oracle Analytics.

At 801, desired changes to a data model and/or configuration metadata are pushed to a configuration store. In one embodiments, the configuration store is GitHub. The changes are human readable, so they can be made manually by an end user. Example of changes are incoming data changes or the creation of pre-built dashboards for visualization of data. Examples of changes can be adding/modification/deletion of table, column, view or other database object. An end user will see it as a change in displayed values in the UI, such as a changed folder name, modified list of attributes, etc. Further, when the database model schema is changed, before 801, the metadata configurations makes the RPD compliant with the updated schema.

In embodiments, the changes (i.e., metadata configurations or "declarative" configurations) are implemented in a JSON file (.js file). The changes are part of the metadata configurations or catalog files and are dynamically included in the RPD in embodiments. A partial example of the JSON file at 801 is as follows:

```
{
    "Schemas": [
        {
            "Name": "RPD_GENERATOR",
            "Tables": [
                {
                    "Name": "FACT_HOUSEHOLD",
                    "Type": "FACT",
                    "Columns": [
                        { "Name": "Household Count",
                            "Description" : "Household Count",
                            "Expression" : "1",
                            "After Aggregation" : false
```

```
        }
      ]
    },
    {
      "Name": "FACT_OUTBOUND_COMMUNICATIONS",
      "Type": "FACT",
      "Columns": [
        { "Name": "Outbound Communication Count",
          "Description" : "Outbound Communication Count",
          "Expression" : "1",
          "After Aggregation" : false
        }
      ]
    },
    {
      "Name": "FACT_WEB_PAGEVIEWS",
      "Type": "FACT",
      "Columns": [
        {
          "Name": "Web Page View Count",
          "Description" : "Web Page View Count",
          "Expression" : "1",
          "After Aggregation" : false
        },
        {
          "Name": "Unique Page View Count",
          "Business Name": "Unique Page View Count",
          "Description" : "Unique Page View Count",
          "Aggregation Rule": "Count Distinct",
          "Expression" : "\"ID\"",
          "After Aggregation" : false
        }
      ]
    },
    {
      "Name": "FACT_CUSTOMER_ENGAGEMENT",
      "Type": "FACT",
      "Columns": [
        { "Name": "Engagement Count",
          "Description" : "Engagement Count",
          "Expression" : "1",
          "After Aggregation" : false
        },
        {"Name" : "SMS Count",
          "Description" : "SMS Count",
          "Expression" : "CASE WHEN \"CHANNEL\" = 'SMS' THEN 1 ELSE 0 END",
          "After Aggregation" : false,
          "Aggregation Rule": "Sum",
        },
        {"Name" : "SMS Filter",
          "Description" : "SMS Filter",
          "Expression" : "FILTER(\"Fact-Customer Engagement.Engagement Count\" USING
(\"Fact-Customer Engagement.Channel\" = 'SMS'))",
          "After Aggregation" : true,
          "Aggregation Rule": "Sum",
        }
      ]
    },
    {
      "Name": "FACT_WEB_AUTHENTICATIONS",
      "Type": "FACT",
      "Columns": [
        { "Name": "Web Authentications Count",
          "Description" : "Web Authentication Count",
          "Expression" : "1",
          "After Aggregation" : false
        }
      ]
    },
    {
      "Name": "DIM_DATE",
      "Type": "DIMENSION"
    },
    {
      "Name": "DIM_CUSTOMER_LOCATION",
      "Type": "DIMENSION"
    },
    {
      "Name": "DIM_CUSTOMER_STUDY_GROUP",
```

```
            "Type": "DIMENSION"
        },
        {
            "Name": "DIM_WEB_PAGEVIEWS",
            "Type": "DIMENSION"
        },
        {
            "Name": "DIM_CUSTOMER",
            "Type": "DIMENSION"
        }
        ]
    }
    ]
}
```

At 802, the ETL job is built and run. For example, the data analytics company that works with utilities gets a daily feed of data for the millions of customers for each utility client. The raw data that is received is run through a production analytics cluster to curate the information into a usable format. The BI-ETL performs the functionality of the extract, transfer, load process of data into business intelligence databases. ETL is a three-phase process where data is extracted, transformed and loaded into an output data container. The data can be collated from one or more sources and it can also be outputted to one or more destinations.

In embodiments, OAV-BI-ETL is a program written in Java language and executed on a data warehouse (e.g., a Hadoop cluster). OAV-BI-ETL extracts data from the cluster, transforms it and loads into a database, which is used by Oracle Analytics or the BI system as a source of data.

The latest code is used to update the database model to the latest version. In one embodiments, the database is the data source such as an Oracle database. The database model is a database configuration, including tables, columns and view. In one embodiment, the database model is the star schema described above.

At 803, an RPD generator is run to generate RPD ("first RPD"). In embodiments, the RPD is an XML file that represents the database model but is generally not human-readable. In one embodiment, the RPD generator disclosed in U.S. Pat. No. 10,169,378 is used at 803.

At 804, a business intelligence ("BI") server tool is run. The BI server tool uses the XML file from 803 as input and generates a revised RPD file ("second RPD") that is used in OAS. The revised RPD includes metadata configurations and catalog files from the JSON files from 801 that describe what should be included in the RPD. The metadata configuration includes in the revised RPD further includes the schema of the database that was used to generated the RPD at 803. The BI server tool or BI system can be any BI system that utilizes RPD. In one embodiment, the BI system is the Oracle Utilities Opower Analytics Visualization which enables utilities to explore customer data and create custom data extracts and insights related to the Opower program. It includes rich pre-built analytical subject areas and visualizations that allow a client to derive strategic insights from the data, such as the number of communications sent out to customers and how well customers are engaging with the Opower products.

At 805, the RPD is published by uploading the RPD file to a shared location, such as uploading the RPD file to the cloud. The RPD is uploaded in a compiled form of a visual configuration where it can be downloaded to build an image, and it can be available to multiple tenants/users.

At 806, the RPD file is downloaded by developers and used to build an Oracle Analytics Docker image. A "Docker" image is a file used to execute code in a Docker container. Docker images act as a set of instructions to build a Docker container, such as a template. Docker images also act as the starting point when using Docker. An image is comparable to a snapshot in virtual machine ("VM") environments Docker is a set of platform as a service products that use OS-level virtualization to deliver software in packages called "containers." In other embodiments, other containerized functionality can be used instead of Docker that implements a virtualized environment framework. The compiled image can be used by the BI system to automatically create a visualization of data and to emulate results of changes received, and can be received by the BI system as a container. Therefore, at 806, a process runs in a container and uses a declarative configuration to automatically generate visualizations that would otherwise be user-generated via user input to a GUI (i.e., the latter being a known solution to generate per tenant customized visualizations, which is labor intensive).

In embodiments, the uploading/downloading is used because a first system is hosting the instance of the revised RPD that is used by one or more enterprise users. In other embodiments, instead of uploading/downloading, the revised RPD is directly used to build the image.

In embodiments, the functionality of FIG. 8 is the result of a triggered "Jenkins" job. A Jenkins job, in general, is a sequential set of tasks that a user defines. For example, a job can fetch source code from version control, compile the code, run unit tests, and more. Note that in Jenkins, the term "job" is synonymous with "pipeline".

Figure 9:
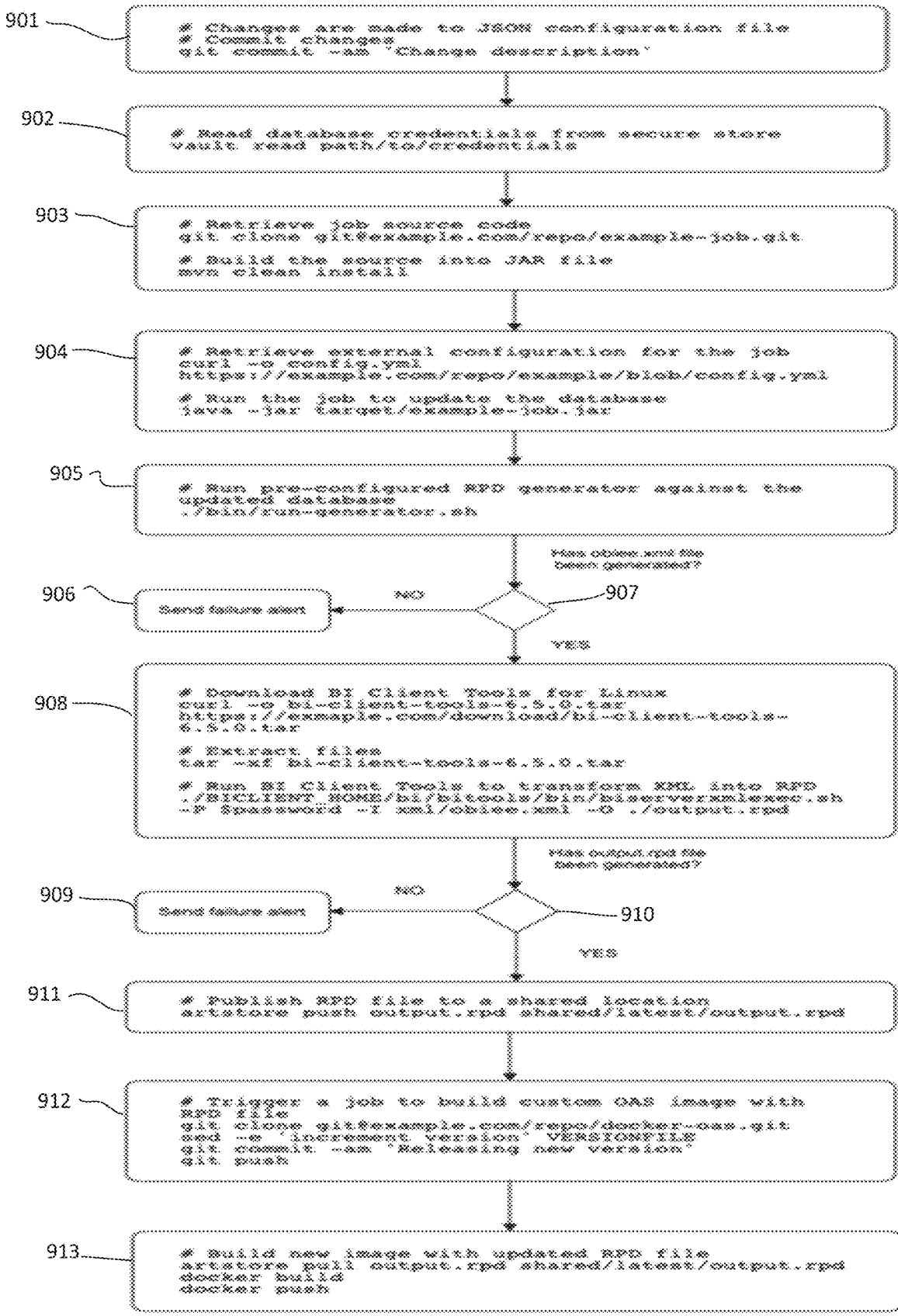
FIG. 9 is a flow diagram of detailed functionality of the dynamic metadata configuration inclusion module of FIG. 2 when performing the dynamic inclusion of metadata configurations into a logical model functionality in accordance to embodiments.

FIG. 9 is a flow diagram of detailed functionality of dynamic metadata configuration inclusion module 16 of FIG. 2 when performing the dynamic inclusion of metadata configurations into a logical model functionality in accordance to embodiments.

At 901, corresponding to 801 of FIG. 8, changes are made to the JSON configuration file, and the changes are committed.

At 902, corresponding to 802 of FIG. 8, the database credentials are read from a secure store, such as an Oracle database or data store 130 of FIG. 1.

At 903, corresponding to 802 of FIG. 8, the job source code (BI-ETL) is retrieved and the source is built into a JAR file.

At 904, corresponding to 802 of FIG. 8, the external configuration for the BI-ETL job is retrieved and the job is run to update the database.

At 905, corresponding to 803 of FIG. 8, the RPD generator, as disclosed in U.S. Pat. No. 10,169,378, is run against the updated database.

At 907, corresponding to 803 of FIG. 8, it is determined if the XML file has been generated by the RPD generator. If no, at 906 a failure alert is sent. The generation of the XML file can fail if the job code is incorrect, database configuration is incorrect, RPD generator validations are not passed, infrastructure issues occurred, etc.

At 908, corresponding to 804 of FIG. 8, BI client tools from, for example, Oracle Corp. are downloaded and run to transform the XML into RPD. The BI client translates the XML output of RPD generator into the RPD binary file.

At 910, corresponding to 804 of FIG. 8, it is determined if the RPD file has been generated. If not, at 909 a failure alert is generated.

At 911, corresponding to 805 of FIG. 8, the RPD file is published to a shared location.

At 912, corresponding to 806 of FIG. 8, a job is triggered to build a custom OAS image with the RPD file.

At 913, corresponding to 806 of FIG. 8, the new image is built with the updated RPD file.

FIG. 9 illustrates command line commands for performing the process/method. In one embodiment, the commands are automated and executed as a part of the code, but for visibility they are specified as command line commands.

In embodiments, the RPD file is generated and stored outside of the analytics instance. The analytics instance itself then the results of the disclosed process (i.e., the OAS Docker image at 806/913).

With the functionality of FIG. 9, no access to credentials is required so anyone can make changes without having access to those credentials (i.e., no direct access to credentials is required to trigger the process). The credentials themselves are required during the automated execution to access database, but no human will read them.

The access control to trigger the process is controlled at the level of source version control system (e.g., Git). Git has its own credentials as well as a process of peer review of changes before they are accepted.

Embodiments provide superior security and aligns with infrastructure as a code pattern. Infrastructure as code is the process of managing and provisioning computer data centers through machine-readable definition files, rather than physical hardware configuration or interactive configuration tools.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of generating changes to a logical model, the method comprising:
 receiving the changes in a configuration file, the changes comprising a declarative configuration;
 extracting the changes and loading the changes into a database and updating a corresponding database model, the database model comprising a configuration of the database;
 generating a first logical model that represents the database model without the changes in the configuration file;
 generating a second logical model comprising revising the first logical model to incorporate the changes in the configuration file into the second logical model; and
 generating automatically in a container using the declarative configuration a compiled visualization image from the second logical model, wherein the visualization image is adapted to be used by a business intelligence system to provide a visualization of data that incorporates the changes.

2. The method of claim 1, wherein the first logical model comprises a first business intelligence repository database file (RPD) file and the second logical model comprises a second RPD file, wherein the first RPD file and the second RPD file comprise physical-to-logical mappings.

3. The method of claim 2, wherein the generating the first logical model comprises using an RPD generator.

4. The method of claim 1, wherein the changes comprise metadata.

5. The method of claim 1, wherein the changes comprise a catalog file.

6. The method of claim 1, further comprising:
 uploading the second logical model, wherein the uploaded second logical model is adapted to be downloaded by one or more enterprise users in order to generate the visualization of data.

7. The method of claim 1, further comprising:
 changing a database model schema, wherein the second logical model incorporates the changed database model schema.

8. The method of claim 1, wherein the configuration file comprises a JavaScript object notation (JSON) file that comprises a human-readable file.

9. A non-transitory computer readable medium having instructions stored thereon that, when executed by one or more processors, cause the processors to generate changes to a logical model, the generating comprising:
 receiving the changes in a configuration file, the changes comprising a declarative configuration;
 extracting the changes and loading the changes into a database and updating a corresponding database model, the database model comprising a configuration of the database;
 generating a first logical model that represents the database model without the changes in the configuration file;
 generating a second logical model comprising revising the first logical model to incorporate the changes in the configuration file into the second logical model; and
 generating automatically in a container using the declarative configuration a compiled visualization image from the second logical model, wherein the visualization image is adapted to be used by a business intelligence system to provide a visualization of data that incorporates the changes.

10. The computer readable medium of claim 9, wherein the first logical model comprises a first business intelligence repository database file (RPD) file and the second logical model comprises a second RPD file, wherein the first RPD file and the second RPD file comprise physical-to-logical mappings.

11. The computer readable medium of claim 10, wherein the generating the first logical model comprises using an RPD generator.

12. The computer readable medium of claim 9, wherein the changes comprise metadata.

13. The computer readable medium of claim 9, wherein the changes comprise a catalog file.

14. The computer readable medium of claim 9, the generating further comprising:
uploading the second logical model, wherein the uploaded second logical model is adapted to be downloaded by one or more enterprise users in order to generate the visualization of data.

15. The computer readable medium of claim 9, the generating further comprising:
changing a database model schema, wherein the second logical model incorporates the changed database model schema.

16. The computer readable medium of claim 9, wherein the configuration file comprises a JavaScript object notation (JSON) file that comprises a human-readable file.

17. A system for generating changes to a logical model, the system comprising:
one or more processors configured to:
receive the changes in a configuration file, the changes comprising a declarative configuration;
extract the changes and load the changes into a database and update a corresponding database model, the database model comprising a configuration of the database;
generate a first logical model that represents the database model without the changes in the configuration file;
generate a second logical model comprising revising the first logical model to incorporate the changes in the configuration file into the second logical model; and
generate automatically in a container using the declarative configuration a compiled visualization image from the second logical model, wherein the visualization image is adapted to be used by a business intelligence system to provide a visualization of data that incorporates the changes.

18. The system of claim 17, wherein the first logical model comprises a first business intelligence repository database file (RPD) file and the second logical model comprises a second RPD file, wherein the first RPD file and the second RPD file comprise physical-to-logical mappings.

19. The system of claim 18, wherein the generating the first logical model comprises using an RPD generator.

20. The system of claim 17, wherein the changes comprise metadata.

* * * * *